United States Patent [19]

Barecki

[11] E Re. 29,522

[45] Reissued Jan. 24, 1978

[54] TRANSIT SEAT WITH CONTOURED PLASTIC SHELL

[75] Inventor: Chester J. Barecki, Grand Rapids, Mich.

[73] Assignee: American Seating Company, Grand Rapids, Mich.

[21] Appl. No.: 699,601

[22] Filed: June 24, 1976

Related U.S. Patent Documents

Reissue of:

[64] Patent No.: 3,747,978
Issued: July 24, 1973
Appl. No.: 232,430
Filed: Mar. 7, 1972

[51] Int. Cl.[2] ..... A47C 1/12; A47C 5/00; A47C 7/00

[52] U.S. Cl. ..... 297/445; 297/283; 297/232; 297/455

[58] Field of Search ..... 297/92, 232, 233, 283, 297/312, 445, 446, 448, 454–456, DIG. 1, DIG. 2

[56] References Cited

U.S. PATENT DOCUMENTS

| | | | |
|---|---|---|---|
| 2,669,288 | 2/1954 | Bargen | 297/160 X |
| 2,837,390 | 6/1958 | Von Der Hellen | 108/150 X |
| 3,012,818 | 12/1961 | Brown | 297/446 X |
| 3,031,227 | 4/1962 | Van Buren | 297/DIG. 2 |
| 3,065,030 | 11/1962 | Gegoux et al. | 297/445 |
| 3,124,390 | 3/1964 | Eames et al. | 297/DIG. 2 |
| 3,159,428 | 12/1964 | Schier | 297/DIG. 2 |
| 3,213,570 | 10/1965 | Abrahamson | 297/DIG. 2 |
| 3,223,450 | 12/1965 | Pollock | 297/445 |
| 3,625,565 | 12/1971 | Barecki | 297/232 |
| 3,642,322 | 2/1972 | Bilancia | 297/445 |
| 3,729,226 | 4/1973 | Barecki | 297/232 |

FOREIGN PATENT DOCUMENTS

| | | | |
|---|---|---|---|
| 696,024 | 10/1964 | Canada | 297/445 |
| 614,666 | 1/1961 | Italy | 297/DIG. 2 |

*Primary Examiner*—James C. Mitchell
*Attorney, Agent, or Firm*—Price, Heneveld, Huizenga & Cooper

[57] ABSTRACT

A two-passenger seat for public transportation vehicle includes a frame of rectangular tubing with a recessed seat area for receiving a one-piece molded plastic shell which is provided with contoured seat and back areas for each of two side-by-side passengers. A single pedestal having a rectangular cross section elongated in the fore-and-aft direction is located beneath the seat spaced inwardly of the aisle end. Separate replaceable cover inserts are received in the seat and back contoured portions which act to retain passengers in place during turns while providing versatility and modification possibilities in seat and back covers.

5 Claims, 17 Drawing Figures

TRANSIT SEAT WITH CONTOURED PLASTIC SHELL

Matter enclosed in heavy brackets [ ] appears in the original patent but forms no part of this reissue specification; matter printed in italics indicates the additions made by reissue.

BACKGROUND AND SUMMARY

The present invention relates to passenger seats; and more particularly, it relates to a two-passenger seat designed for use in public transportation vehicles, such as buses, rapid transit trains, etc.

It is desirable to provide such a seat that is not only economical to manufacture, rugged and durable in use, safe in the event of a crash, and easy to maintain, but it is also important to provide versatility in the seating and to have a pleasant aesthetic appearance.

In connection with safety, the primary objective to prevent injury is to retain the occupant in his seat under conditions where the vehicle generates forces due to deceleration or component lateral forces due to a change of direction, as in sharp turns.

A properly designed seat contour, with sufficient inclined area will retain the occupant up to twice the acceleration of gravity, g, whereas a poorly developed contour will not prevent the occupant from sliding off the seat at forces below 1 g.

The seat must also absorb energy and moderate the magnitude of energy transmitted to an occupant. The seat must act as a compartment to restrain the occupant and prevent his becoming a projectile in the event of a crash. The seat must serve as a protective shield to ward off blows from projections of collapsing structures. Above all the seat must be structurally crashworthy to provide desirable deformation characteristics and still sufficiently strong to prevent disintegration.

The rear surface of seat should not only be aesthetically pleasing but it should be devoid of hazardous members that could become lethal objects in the event of crash.

The transit seat of the present invention provides a frame of rectangular tubing having a recessed seat area for receiving a one-piece molded plastic shell which is provided with contoured seat and back areas for each of two side-by-side passengers held by the seat. A single pedestal having a rectangular cross section elongated in the fore-and-aft direction is located beneath the seat spaced inwardly of the aisle end of the seat for supporting it. The other end of the seat is preferably connected to a wall of the vehicle.

Separate replaceable cover inserts are received in the contoured portions of the seat and back; and the contours are such that even though a cover insert is attached to the seat, there is still sufficient contour to retain passengers in place during turns of the vehicle. This has been found to be of significant advantage, particularly in buses and other public transporation vehicles wherein the seats are located relatively closely behind a forward seat. In other words, an aisle rail need not be provided with each seat, and this facilitates ingress and egress, while at the same time, a passenger has a feeling of stability during the various conditions of riding.

Any number of different types of cover inserts may be secured to the plastic shell, and this adds versatility to the use of the basic seat. For example, in areas where vandalism to public vehicles may be high, a plastic insert panel may be used. On the other hand, where wear is of primary concern, a vinyl-clad steel is preferred for each insert. A note of luxury may be added by padding the insert panels. This feature further adds to the versatility in the aesthetic appearance of the seat because, without significantly adding to cost and permitting the proper contour for all inserts for lateral retention of occupants. The color scheme can be varied from bus to bus or within a given bus, and the entire color scheme of the seating may be changed with minimal cost.

A grab rail of round tubular steel grabs is inserted into open ends of square side frame tubes beneath a top flange in the shell, and this softens the lines of the seat and enhances its appearance by hiding from view this connection. Thus, square or rectangular tubing may be used for the frame with its greater strength per unit cross sectional area, and round tubing may be used for the grab rail since it is more comfortable.

Another feature of the invention is that it permits the construction of a seat employing a plastic shell which is securely supported by its frame, so that the seat will not disintegrate in the event of a crash. Toward this end, the shell is secured at the top of the back and along the leg support bar.

The pedestal is secured to a transverse frame member spaced inwardly from the aisle, as mentioned, and this removed under-seat obstructions to persons moving up and down the aisle, as has been commmon in certain prior seats. Further, the pedestal is provided with a smoothly curved foot pad to facilitate cleaning around the aisle, and to eliminate any dirt-catching projections or recesses. To further facilitate cleaning, the one-piece plastic shell when fitted with properly contoured insert panels also does not have any dirt-catching pockets.

Certain aspects of the present invention are disclosed in but not claimed in an application in which I am coinventor, namely the application of Barecki and Karrip for "Rapid Transit Seating," Ser. No. 157,345, *now U.S. Pat. No. 3,737,198,* which is directed to a cantilever transit seat.

Other features and advantages of the present invention will be apparent to persons skilled in the art from the following detailed description of a preferred embodiment accompanied by the attached drawing wherein identical reference numerals will refer to like parts in the various figures.

THE DRAWING

DETAILED DESCRIPTION

Figure 1:
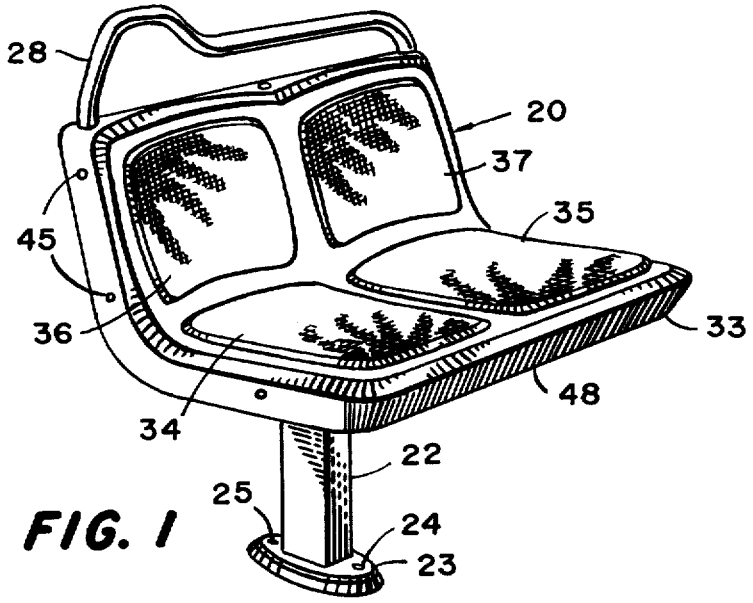
FIG. 1 is a front perspective view of a transit seat, taken from the aisle, constructed according to the present invention.
Figure 2:
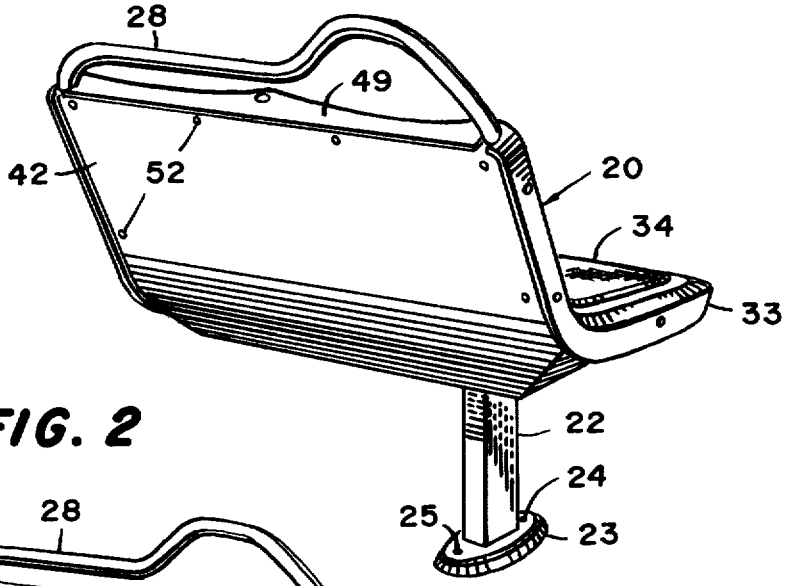
FIG. 2 is a rear perspective view of the transit seat of FIG. 1, also taken from the aisle.
Figure 3:
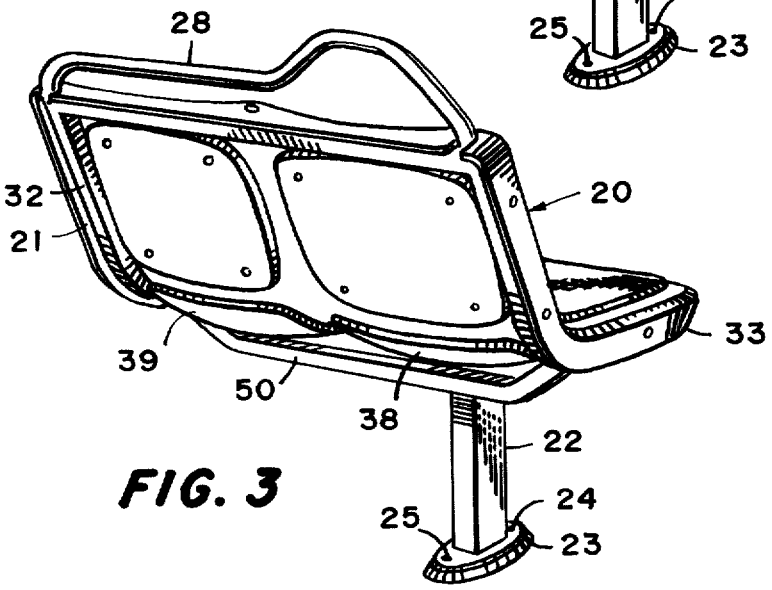
FIG. 3 is a view similar to that of FIG. 2 of a modification of the seat, excluding a rear cover panel.
Figure 4:
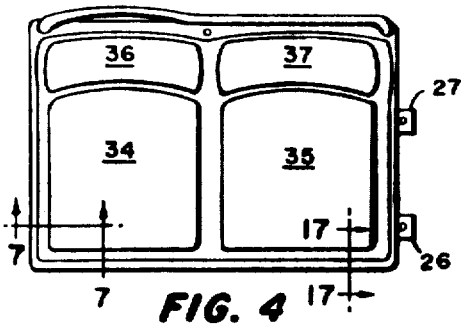
FIGS. 4, 5 and 6 are respectively plan, front, and aisle side views of the seat of FIG. 1.
Figure 7:
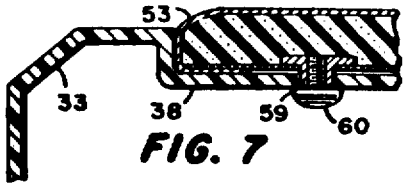
FIGS. 7–13 are similar sectional views taken through the sight line 7—7 of FIG. 4 to show different methods of attaching insert panels, depending upon the construction of the panel.
Figure 8:
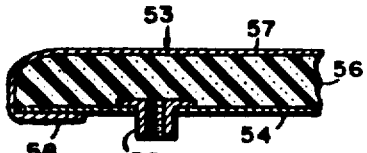
Figure 5:
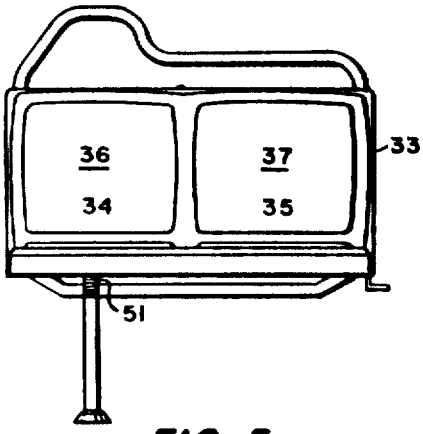
Figure 14:
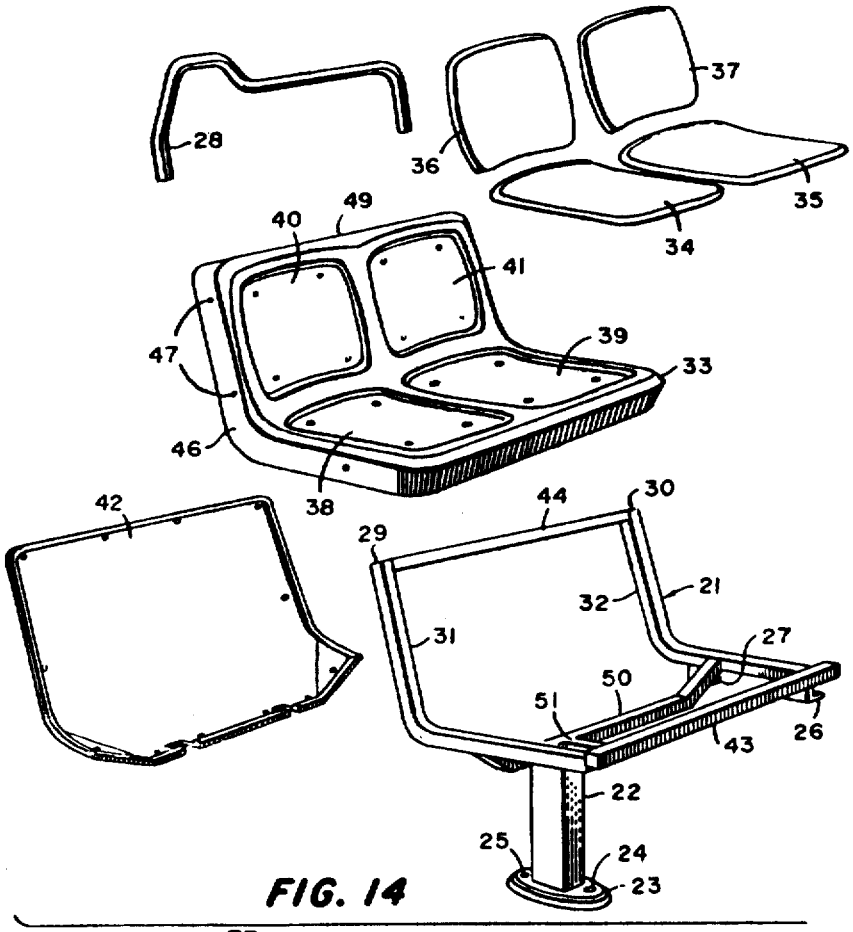
FIG. 14 is an exploded perspective view of an entire seat constructed according to the present invention.

Referring now to FIG. 1, a transit seat generally designated 20 includes a square tubular frame 21 supported by a column or pedestal 22 atop an oval flared foot 23 preferably having two mounting holes 24 and 25. The column has a rectangular cross section which is elongated in the fore-and-aft direction of the seat. The frame 21 is attached to the wall of the vehicle by two L-shaped wall mounting brackets 26 and 27; and the seat of this embodiment is provided with a round tubular grab rail 28 inserted into open upper ends 29 and 30 of a pair of side L-shaped square tubes 31, 32 as best seen in FIG. 14. The frame 21 supports a single-piece Fiberglas shell 33 preferably decoratively covered by seat insert panels 34, 35 as well as back insert panels 36, 37 for side-by-side passenger accommodation. The insert panels are received in appropriately provided recesses 38, 39, 40 and 41. A suitably shaped back cover panel 42 is also provided, but may be eliminated in the embodiment of FIG. 3, which is otherwise similar.

The contouring of the recesses 38–41, even when the associated insert panels 34, 37 have been secured to the shell, is maintained; and this is considered an important feature of the present invention in that it provides for retention of the seated passengers even during sharp turns. That is to say, the passenger has a sense of stability in riding, so much so that the need for a side arm rail is obviated. This is important in the case of transit seating because of the close spacing between one seat and the seat in front of it. If a side rail were included, ingress or egress to the seat would be partially obstructed. Thus, the insert panels 34–37 are characterized in that they conform to the contour of their associated recesses; and, secondly, they are relatively thin and of substantially uniform thickness so as to maintain their respective contours and retain the body of a seated passenger.

The plastic shell 33 rests on a raised transverse front rail 43 (i.e., a front stretcher tube) of square tubing and a similar upper rear rail or stretcher tube 44 and is attached to the square tubular frame by means of several tubular rivets 45 inserted through the side flanges 46 of the shell and the L-shaped end tubes 31 and 32. The holes 47 for the tubular rivets are drilled at the time of assembly so that there does not have to be any matching of holes in the two joining pieces. Tubular rivets are purposely omitted from the front edge flange 48 to avoid any snagging of clothing.

A lower rear cross tube or stretcher tube 50 is purposely depressed in its center portion in order to provide clearance for the bucket-type recesses 38 and 39 of the shell. This can be seen best in FIG. 3. This cross tube 50 is connected to the front cross tube 43 by a forwardly extending tube 51. The tube 51 adds rigidity to the frame structure and also serves to strengthen the location at which the supporting column 22 is secured to the frame. The back cover panel 42 is attached to the frame 21 with thread cutting screws 52; and it is also preferably molded from a single sheet of plastic, such as Fiberglas.

Although the invention is not so limited, there are three types of insert panels, illustrated in FIGS. 7 through 13. A padded insert panel 53 (FIGS. 7 and 8) are for more luxurious coaches. It consists of a die formed steel panel 54 provided with several weld tee nuts 55, a foam pad 56, and suitable upholstery material 57 which is stretched over the foam pad and cemented to the underside of the steel panel 58. The tee nuts fit into holes 59 in the shell recess 38 and are held in place by screws 60 which are preferably Phillips recess type so that they cannot be easily removed by using a small coin as a screw driver. Alternatively, tamper-proof screws which require a special wrench may be employed.

Figure 9:
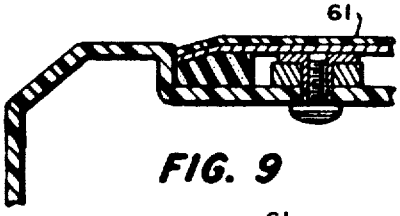
Figure 10:
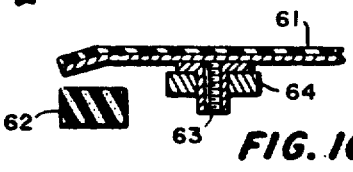

A second type of insert panel is shown in FIGS. 9 and 10. As seen therein, a vinyl-clad steel panel 61 has a backing strip of rubber 62 to raise the panel to the level of the shell 33 while acting as a shock-absorbing cushion. It is attached to the shell by the use of tee nuts 63 and washers 64 used as spacers.

Figure 11:
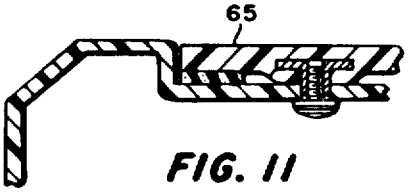
Figure 6:
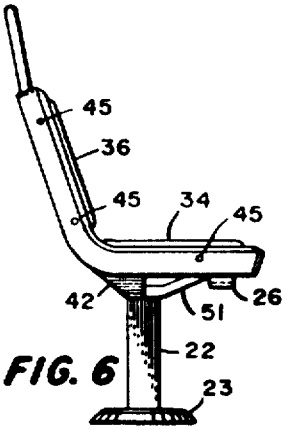
Figure 12:
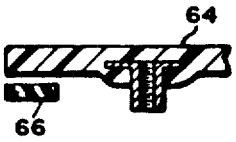
Figure 13:
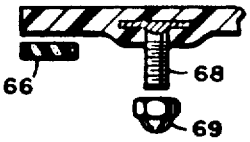

In neighborhoods where vandalism may be expected, a Fiberglas insert panel 65 may be used as a decorative panel, FIGS. 11 through 13. The panel need not be very thick, so there is a peripheral strip of rubber 66 under the edge to raise the panel up to the level of the shell surface. The tee nuts 67 are set into the Fiberglas panel when the panel is formed.

FIG. 13 shows the use of studs 68 and acorn nuts 69 in place of tee nuts and screws. This substitution may be used on any of the disclosed variations.

Figure 15:
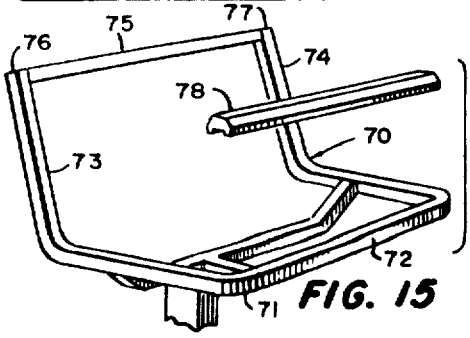
FIG. 15 is a fragmentary perspective view of a modified frame for the seat including a continuous square tube around the front and sides of the frame.

Referring now to FIG. 15 a variation of the seat frame is shown and designated by reference numeral 70. The seat frame 70 includes a continuous square tube 71 which forms the front 72 and sides 73 and 74 of the frame, with a separate top rail 75 at the upper rear of the frame. The curved U shaped tube 71 terminates at the upwardly facing portions adjacent the ends of the rear tube 75 to receive the ends of a round tubular grab rail similar to the grab rail 28, shown in FIG. 14. The rest of the frame construction is similar to that shown in FIG. 14.

Figure 16:
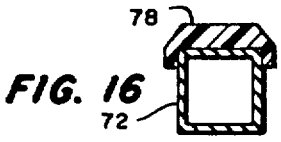
FIG. 16 is a sectional view taken through the front stretcher rail of the seat of FIG. 15.

A rigid vinyl extrusion 78 is shown exploded off the front portion 72 of the continuous square rail, in FIG. 15, and is shown attached to it in FIG. 16. The extrusion 78 acts as a cushion and minimizes wear at a location of stress in the shell/frame interface. It also raises the level of the front portion 72 of the rail 71.

Figure 17:
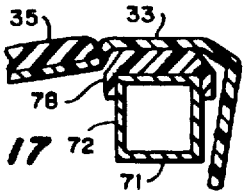
FIG. 17 is a fragmentary sectional view taken through the sight line 17—17 of FIG. 4; and including the final extrusion for the embodiment of FIG. 15.

In FIG. 17 the front portion 72 of the continuous rail 71 is shown with the rigid vinyl extrusion 78 on it, and then the Fiberglas shell 33 in place on the extrusion. As in the earlier version, the only place that the shell rests on the frame are along the extrusion 78 at the front of the seat and along the top rail 75 at the upper rear. The Fiberglas shell is attached to the frame in the same manner as before with tubular rivets 45 along the sides 46 and upper rear edge flange 49 of the shell.

I claim:

1. A transmit seat for accommodating a plurality of passengers side-by-side and having an aisle side and a wall side comprising: a tubular frame including first and second side members formed in the general shape of a L to provide seat and back portions; a first stretcher tube interconnecting the forward ends of said seat portions of said side frame members; a second stretcher tube interconnecting the upper ends of said side frame members; a third stretcher tube connecting said side members at the rear of said seat portion thereof and defining a central recess; a forwardly extending tubular frame member interconnecting said first stretcher tube with the depressed portion of said transverse tubular frame member and located at a position spaced inwardly of the aisle side of said seat; means for securing the side frame member adjacent said wall side of said seat to the wall of a vehicle; a single pedestal connected to said frame for attachment to the floor of a vehicle and extending downwardly from the interconnection of said [depressed portion] *central recess* of said third stretcher tube and a rear end of said forwardly extending frame member; and a single-piece plastic shell *restingly* secured to said frame only at said first and second stretcher tubes; said plastic shell providing individual contoured recesses for receiving inserts and retaining passengers in position during turns.

2. The seat of claim 1 wherein said first and second L-shaped side frame members define upper rear openings located beneath an upper rear flange of said shell; said seat further comprising a tubular grab rail of round cross section extending behind said seat and upwardly of the back portion thereof received in the openings of said side frame members in an out-of-sight location.

3. The seat of claim 1 further comprising a smoothly curved base plate attached to the floor of said vehicle adjacent said pedestal to facilitate cleaning of the floor of said vehicle; and bolt means for securing said base plate to said floor at locations fore and aft of said pedestal.

4. The seat of claim 3 wherein said pedestal is characterized in having a rectangular cross section, the longitudinal direction thereof extending in the fore-and-aft direction of said seat.

5. The seat of claim 1 wherein said seat is characterized as having a single tubular member forming said L-shaped angle members and said first stretcher thereof, said seat further including a vinyl plastic extrusion spaced between front stretcher tube of said frame and said shell to cushion the same.

* * * * *